United States Patent
Ikeda (10) Patent No.: US 6,772,284 B2
(45) Date of Patent: Aug. 3, 2004

(54) DISK APPARATUS CAPABLE OF CONTINUOUS DISPLAY OF DATA USING A SINGLE RECORDING HEAD

(75) Inventor: Kenichi Ikeda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/040,338

(22) Filed: Mar. 18, 1998

(65) Prior Publication Data

US 2001/0042165 A1 Nov. 15, 2001

(30) Foreign Application Priority Data

Mar. 18, 1997 (JP) .............................. 9-065055

(51) Int. Cl.⁷ .............................................. G06F 12/00
(52) U.S. Cl. .................... 711/113; 386/124; 386/126; 386/52
(58) Field of Search ............................. 711/4, 110, 111, 711/112, 113; 386/124, 125, 126, 4, 52, 54, 55, 56; 360/32, 78.07, 98.01; 345/328, 723, 724, 725, 726; 707/500.1; 369/47.32, 47.33, 30, 34

(56) References Cited

U.S. PATENT DOCUMENTS

| | | | | |
|---|---|---|---|---|
| 4,210,931 A | * | 7/1980 | Bailey et al. ............... | 386/125 |
| 4,258,385 A | * | 3/1981 | Greenberg et al. .......... | 386/38 |
| 4,707,731 A | * | 11/1987 | Ghazey ....................... | 348/578 |
| 4,862,411 A | * | 8/1989 | Dishon et al. .............. | 711/112 |
| 5,212,798 A | * | 5/1993 | Kanda ....................... | 711/112 |
| 5,388,197 A | * | 2/1995 | Rayner ....................... | 395/328 |
| 5,436,875 A | | 7/1995 | Shinada ..................... | 369/32 |
| 5,559,776 A | | 9/1996 | Ikenaga ..................... | 369/47 |
| 5,608,698 A | | 3/1997 | Yamanoi et al. ............. | 369/54 |
| 5,642,338 A | * | 6/1997 | Fukushima et al. ........... | 386/1 |
| 5,675,383 A | * | 10/1997 | Yagasaki et al. ............ | 386/46 |
| 5,687,161 A | * | 11/1997 | Owaki ........................ | 360/48 |
| 5,708,632 A | * | 1/1998 | Totsuka et al. .............. | 369/32 |
| 5,760,767 A | * | 6/1998 | Shore et al. ................ | 345/723 |
| 5,826,110 A | * | 10/1998 | Ozden et al. ............... | 711/167 |
| 5,884,004 A | * | 3/1999 | Sato et al. ................. | 386/126 |
| 5,943,304 A | * | 8/1999 | Kamada et al. ............. | 711/111 |
| 5,999,173 A | * | 12/1999 | Ubillos ...................... | 345/328 |
| 6,041,354 A | * | 3/2000 | Biliris et al. ............... | 709/226 |
| 6,072,648 A | * | 6/2000 | Gaertner et al. ............. | 360/48 |
| 6,201,924 B1 | * | 3/2001 | Crane et al. ................ | 386/52 |
| 6,301,204 B1 | * | 10/2001 | Yamada et al. ........... | 369/34.01 |

FOREIGN PATENT DOCUMENTS

EP 0656626 6/1995

OTHER PUBLICATIONS

EP Search Report for EP 98104946 dated Oct. 30, 2003.

* cited by examiner

Primary Examiner—Matthew Kim
Assistant Examiner—Woo H. Choi
(74) Attorney, Agent, or Firm—Pillsbury Winthrop LLP (57) ABSTRACT

A disk apparatus for reproducing in a preliminary determined order digital video data recorded in a plurality of areas of an optical disk at different positions with respect to the radial position of the optical disk in a reproduction mode by an optical head. The reproduced video data is stored in a buffer memory and encoded by an MPEG decoder. The amount of digital video data corresponding to the access time for accessing the recording areas of the optical disk are reproduced from the optical disk at a speed higher than the bit rate at which the video data is input or output and stored in the buffer memory. The digital video data are continuously read out and reproduced from the buffer memory when the optical head is in the recording areas and accesses between the recording areas.

8 Claims, 4 Drawing Sheets

DISK APPARATUS CAPABLE OF CONTINUOUS DISPLAY OF DATA USING A SINGLE RECORDING HEAD

BACKGROUND OF THE INVENTION

The present invention relates to a disk apparatus for recording and reproducing digital continuous data, such as video data. More particularly, the present invention relates to a disk apparatus capable of continuously reproducing digital data recorded in different positions with respect to the radius direction on a recording disk.

Video disks are being developed for recording and reproducing (writing and reading) digital video data in-and-from a storage medium, using digital video compression. One example of such a storage medium is an optical disk. The Moving Picture Experts Group (MPEG) is an example of one such digital video compression method.

In a conventional video disk apparatus using an optical disk, digital video data is temporarily stored in a buffer memory. Digital video data may he compressed by a digital video compressor, such as an MPEG encoder, or transmitted by broadcasting the data, or transmitting it via CATV (cable television). In the buffer memory, the difference between the bit rate (number of bits to be sent per second) of the input digital video data and the recording and reproducing speed (write-in and readout speed) of the optical disk (number of bits to be recorded/reproduced per second) is adjusted. In general, tile bit rate of the digital video data is slower than the bit rate of the recording and reproducing speed of the optical disk.

As an example of the application of such a video disk apparatus, a plurality of digital video data is recorded in different positions with respect to the radial direction of an optical disk and is reproduced in an optional order. For example, a digital video D1 starting from a radius R1 position, a digital video D3 at a radius R3 position, and a digital video D2 at a radius R2 position are to be reproduced in this order. Herein, R1<R2<R3. In this case, after reproducing the digital video starting from the radius R1, an optical head is moved to the radius R3 position so as to reproduce the digital video D3. Then, the optical head is moved to the radius R2 position for reproducing the digital video D2.

Since tile video data cannot be reproduced from the optical disk when the optical head accesses the optical disk, at the time of changing tie reproduction from the video D1 to tile video D3, or from the video D3 is to the video D2, the video is interrupted. That is, the videos cannot be reproduced continuously. In order to solve this problem, a technology has been proposed where two optical heads are provided in a laser disk apparatus, so that one is positioned at a radius position of a currently reproduced video, and the other one positioned at a radius position of a subsequently reproduced video. By switching the heads at the time of changing the videos, the reproduction incapability because of the access can be eliminated so as to enable the continuous video reproduction. However, this method has a major setback in that using two optical heads raises the cost.

BRIEF SUMMARY OF THE INVENTION

An object of the present invention is to provide a video disk apparatus capable of continuously reproducing a plurality of digital continuous data, such as video data, stored in areas of different positions with respect to the radial direction of the recording medium, without interruption using one recording and reproducing head.

The present invention provides a disk apparatus comprising a continuous data input and output section for inputting and outputting continuous data at a first bit rate. The disk apparatus also comprises a recording and reproducing section for selectively recording and reproducing the continuous data in and from a disk-like recording medium at a second bit rate higher than the first bit rate. The disk apparatus further comprises a buffer memory coupled between the continuous data input and Output section and the recording and reproducing section. The buffer memory temporarily stores the continuous data to compensate the bit rate difference between the continuous data input and output section and the recording and reproduction section. Also, the disk apparatus comprises a control section. The control section controls the recording and reproducing section to successively reproduce, in a predetermined order, continuous data stored in a plurality of areas in the recording medium at different positions with respect to a radial direction of the recording medium. The control section controls the recording and reproducing section and the buffer memory. The buffer memory stores digital continuous data for a time length more then the access time for accessing the plurality of areas from the recording medium. The access is performed at a second bit rate in the data input and output section. The continuous data, stored in the buffer memory to the input and output section, is continuously read out during the reproduction operation and the access time of the recording and reproducing section.

According to the present invention, a plurality of digital continuous data, such as video data stored in areas in different positions with respect to the radial direction of the recording medium, can be reproduced continuously with one recording and reproducing head without interruption.

In a disk apparatus of tile present invention, digital continuous data, recorded in a recording medium, is reproduced at a speed higher than the bit rate of the digital continuous data for storage in a buffer memory, and the digital continuous data is read out from the buffer memory by the bit rate of the continuous digital data to reproduce the continuous video information.

Since the reproducing speed from the recording medium is higher than the bit rate of the digital continuous data, there is a speed difference between the speed for storing the digital continuous data in the buffer memory and the speed for reading the digital continuous data from the buffer rate. This results in digital continuous data accumulated in the buffer memory. When the capacity of the buffer memory becomes full, the reproduction from the recording medium is temporarily interrupted. During that period, the digital continuous data is read out at the bit rate from the buffer memory so as to reproduce continuous video information.

When the amount of digital continuous data recorded in the buffer memory is reduced to an appropriate value, the reproduction from the recording medium is resumed. Therefore, the digital continuous data is intermittently reproduced from the recording medium so that the digital continuous data is continuously read out from the buffer memory.

If the pause period of the reproduction from the recording medium is set at a period longer than the average access time of the recording and reproducing head, the recording and reproducing head can be moved. The head can be moved to an area at an optional different position with respect to the radial direction of the recording medium, thus utilizing the pause period to reproduce the other digital continuous data recorded in the area. During the access, the digital continuous data is read out from the buffer memory. Note that the digital continuous data was recorded in an area at the radial position of the recording medium where the recording and reproducing head was placed before moving. Subsequently, the digital continuous data is reproduced from the recording medium at the position where the recording and reproducing head is placed after moving, stored in the buffer memory, and read out from the buffer memory at the bit rate of the digital continuous data.

Accordingly, since the digital continuous data is read out and reproduced from the buffer memory even when the recording and reproducing head is moving, the digital continuous data recorded in areas of different positions with respect to the radius direction of the recording medium can be reproduced without interruption.

The memory capacity for a buffer memory in the present invention can be defined as A*S bits or more, where the bit rate of the digital continuous data is A (bps), and the maximum access time to the recording medium (seeking time for a recording and reproducing head to move from the innermost periphery of the recording medium to the outermost periphery plus time for the recording medium to make a rotation) is S seconds. By providing such a buffer memory, the amount of digital continuous data corresponding to the access time of the recording and reproducing head can be accumulated preliminary in the buffer memory, taking advantage of the difference between the reproducing speeds at which tile digital continuous data is reproduced from the recording medium, all the bit rate of the digital continuous data.

When re-seeking due to an unsuccessful seeking is performed, the memory capacity of the buffer memory can be set at A*S*(N+1) bits or more, where the bit rate of the digital continuous data is A (bps), and the number of the seeking retrials is N.

In a disk apparatus having a function for automatically replacing the recording medium, the memory capacity of the buffer memory can be set at A*S bits or more, where the sum of the maximum time for replacing the recording medium and the maximum access time to the recording medium (seeking time for a recording and reproducing head to move from the innermost periphery of the recording medium to the outermost periphery plus time for the recording medium to make a turn) is S seconds, and the bit rate of the digital continuous data is A (bps). Accordingly, since the digital continuous data for the replacement time of the medium and the access time to the medium can be stored preliminary in the buffer memory and the buffer memory can be read out during the time, a plurality of digital continuous data in areas of different optional positions with respect to the radial direction of a plurality of recording mediums can be reproduced without interruption.

When unsuccessful seeking and unsuccessful replacement of the recording medium occurs, and the seeking and replacing are retried, the memory capacity of the buffer memory can be set at A*S1 (N1+1)+A*S2*(N2+1) bits or more, where the maximum time for replacing the recording medium is S1 second, the number of the retrials at the time of an unsuccessful replacement of the recording medium is N1, the maximum access time to the recording medium (seeking time for a recording and reproducing head to move from the innermost periphery of the recording medium to the outermost periphery plus time for the recording medium to make a turn) is S2 seconds, the number of the retrials at the times of an unsuccessful seeking is N2, and the bit rate of the digital continuous data is A (bps).

Furthermore, in the present invention, when editing the digit continuous data, the editing efficiency can be improved by controlling the digital continuous data, which can be anticipated to be reproduced continuously before editing, since the editing operation can be confirmed before hand.

Addition al objects and advantages of the invention will be set forth in the description which follows, or may be learned by practice of the invention. The objects and advantages of the invention maybe realized and obtained by means of instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
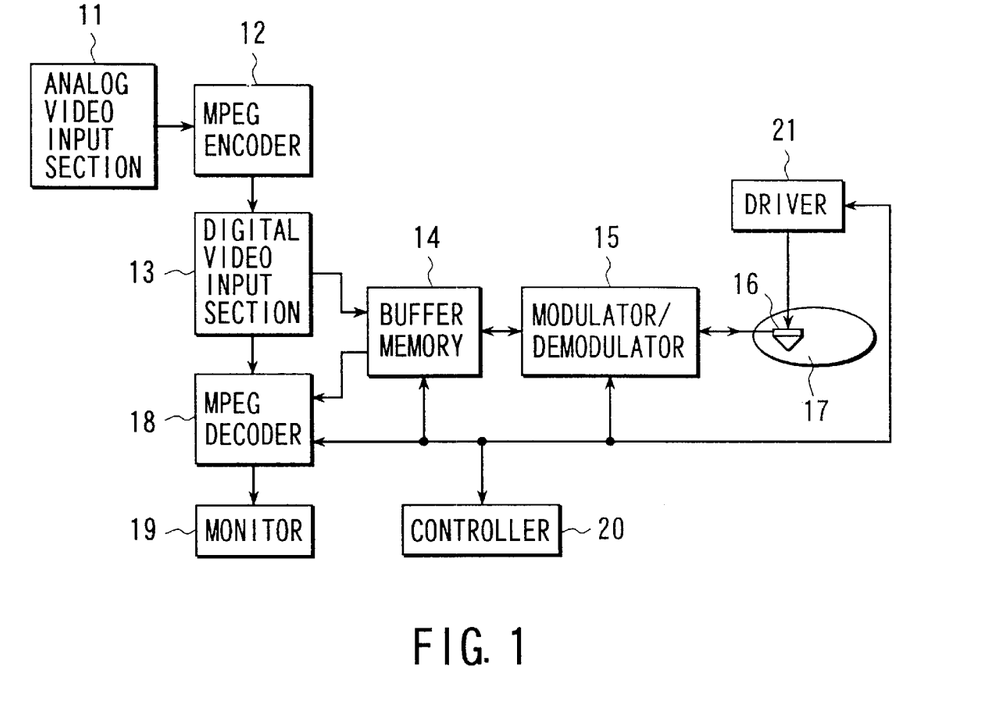
FIG. 1 is a block diagram of a video disk apparatus according to an embodiment of the present invention.

FIG. 1 is a block diagram illustrating a video disk apparatus according to one embodiment of the present invention. A video disk apparatus shown in FIG. 1 comprises an analog video input section 11, a digital video data compressor 12 (such as an MPEG encoder), a digital video input section 13, a buffer memory 14, a modulator/demodulator 15, an optical head 16, a recordable and reproducible medium 17, a digital video data decompressor 18 (such as an MPEG decoder), a monitor 19 for displaying a video, a driver 21 for driving the optical head 16, and a controller 20. The buffer memory 14 comprises a memory capable of reading and writing data at the same time, for example, a dual port memory. The recordable and reproducible medium 17 may be, for example, an optical disk, a phase change recording medium, or a magneto-optical recording medium. The optical head 16 may be, for example, a conventional optical head comprising a semiconductor laser, an objective lens, an image sensor, and the like.

The operation of the video disk apparatus according to this embodiment of the present invention is described.

In an illustrative example of the present invention, and in the description hereinafter, digital video data is output from the MPEG encoder 12 or the digital video input section 13 at the bit rate of 4 Mbps. The following descriptions describes the processing of digital video data as an illustrative example. However, the data may be analog, and is not limited to video data. For example, the data may be audio.

Figure 2:
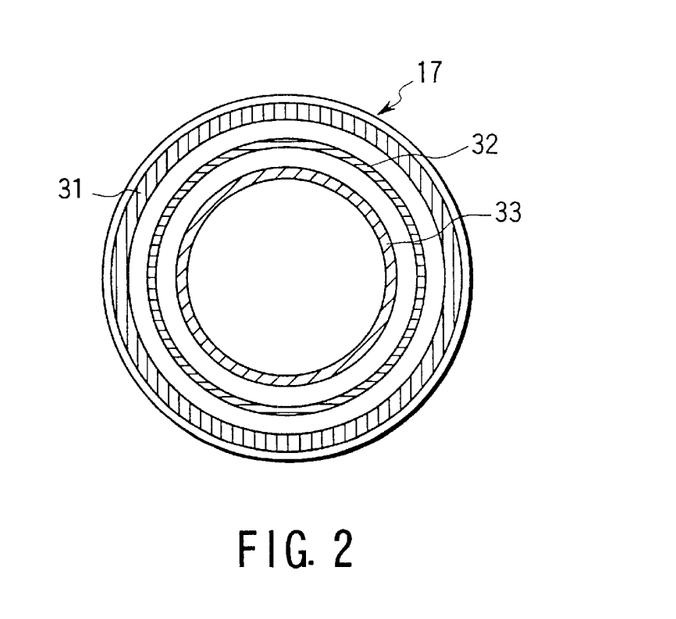
FIG. 2 is a diagram showing recording areas on an optical disk for storing digital video data according to an embodiment of the present invention.

FIG. 2 is a diagram illustrating recording areas of the optical disk 17 according to an embodiment of the present invention. The optical disk 17 includes a plurality of recording areas 31, 32, and 33. Data of a digital video A is recorded (written) in the recording area 31; data of a digital video C is recorded in the recording area 32, and data of a digital video B is recorded in the recording area 33 in the optical disk 17. Digital video data is recorded in the optical disk 17 at a speed of 8 Mbps, for example, by a constant linear velocity method, and reproduced from the optical disk 17 at the same speed. The maximum access time (seeking time for the optical head 16 to move from the innermost periphery to the outermost periphery of the optical disk 17 plus the time for the optical disk 17 to make a rotation thereof) is 0.25 seconds, for example. The memory capacity of the buffer memory 14 is 4 M bits, for example.

In the following operation, the recording and reproduction operation of the optical disk 17 by the optical head 16, the writing/reading operation of the buffer memory 14, and the like, are controlled by the controller 20.

Figure 3:
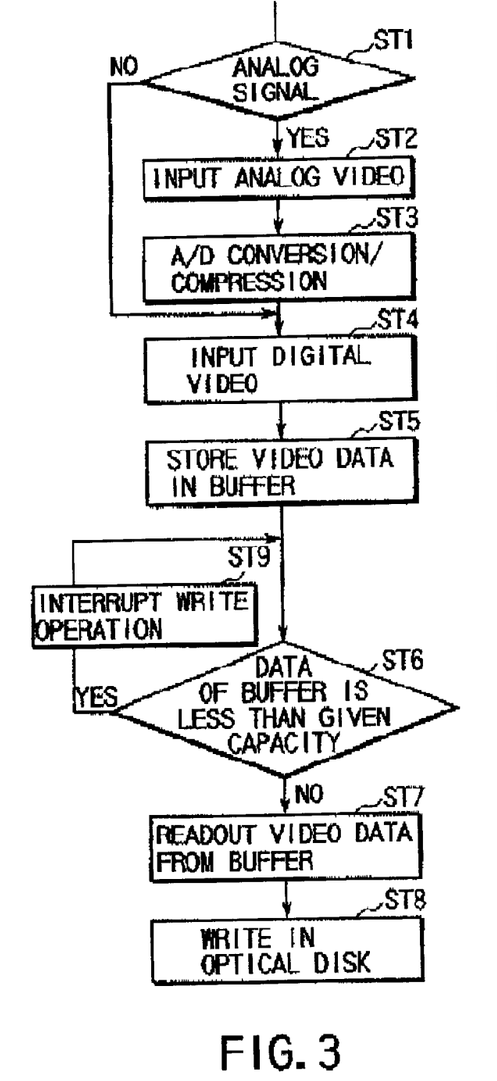
FIG. 3 is a flowchart illustrating the recording operation of the video disk apparatus shown in FIG. 1.

FIG. 3 is a flowchart illustrating the recording operation for recording the digital video data.

It is determined whether an input video signal is an analog signal, such as a NTSC signal (ST1). When the input video signal is the analog signal, the analog video signal is input by the analog video input section 11 to the MPEG encoder 12 (ST2), and subjected to an analog-to-digital conversion and a compression processing (ST3) by the MPEG encoder 12. The digital video signal from the MPEG encoder 12 is input to the digital video input section 13 (ST4).

On the other hand, already compressed digital video data (a "no" response at step ST1), supplied from a CATV, a satellite broadcast, and the like, is input directly to the digital video input section 13. The compressed digital video signal is applied to the buffer memory 14 (ST4), and stored therein (ST5).

At block ST6, it is determined whether the data stored in the buffer memory is not more than a given capacity. If the determination at block ST6 is "YES", the write operation is interrupted during a predetermined time interval (ST9) and the operation returns to ST6. If the determination at block ST6 is "No", the digital video data input from the digital video input section 13 is written in the buffer memory 14 at the speed of, for example, 4 Mbps. Since tile speed of recording the digital video data in the optical disk 17 via the optical head 16 (8 Mbps) is higher than the bit rate of the compressed digital video data supplied from the MPEG encoder 12 (4 Mbps), the digital video data input from the digital video input section 13 is temporarily stored in the buffer memory 14. When the digital video data of an appropriate capacity for storing in the optical disk 17 (such as a capacity for 1 sector or 1 track of the optical disk 17) is stored in the buffer memory 14, the digital video data is read out from the buffer memory 14 at the speed of 8 Mbps (ST7). That is, the controller 20 writes the digital video data from the video input section 13 in the buffer memory 14 at the speed of 4 Mbps. When the video data for 1 sector or 1 track is written in the buffer memory 14, the digital video data is read out from the buffer memory 14 at the speed of 8 Mbps.

The digital video data read out from the buffer memory 14 is applied to the modulator/demodulator 15 and modulated to produce a signal appropriate for recording. The signal is input to the optical head 16 and recorded in the optical disk 17 by the optical head 16 (ST8). The digital video data input from the digital video input section 13 is stored in the buffer memory 14 at the speed of 4 Mbps even during the recording period during which the digital video data is recorded in the optical disk 17 by the optical lead 16.

In case of reproducing data of the video A recorded in the recording area 31 of the optical disk 17, the controller 20 sets the apparatus at a reproduction mode and commands the optical head 16 to move to the starting point of the recording area 31 of the optical disk 17 in the radial direction in view of the header information of the optical disk 17. When the optical head 16 reaches the starting point of the recording area 31, the optical head 16 reads out the digital video data from the optical disk 17 at the rate of 8 Mbps. The read out digital video data is written in the buffer memory 14 via the modulator/demodulator 15 at the rate of 8 Mbps Then the digital video data is read out from the buffer memory 14 to the MPEG decoder 18 at the rate of 4 Mbps. The MPEG decoder 18 decompresses the read out digital video data. The decompressed digital video data is sent to the monitor 19 for display.

Figure 4:
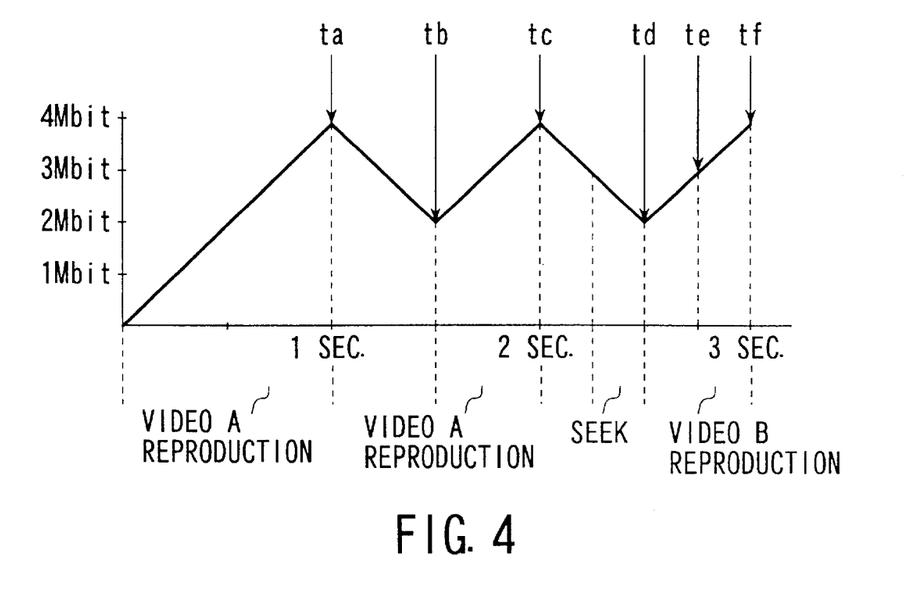
FIG. 4 is a graph showing the change of the quantity of video data in the buffer memory of the video disk apparatus of FIG. 1.
Figure 5A:
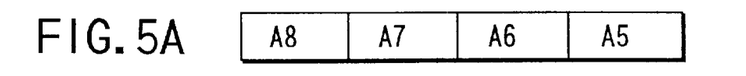
FIGS. 5A to 5F are charts showing the content change of the video data in the buffer memory of the video disk apparatus of FIG. 1.
Figure 5B:
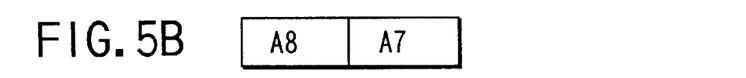
Figure 5C:
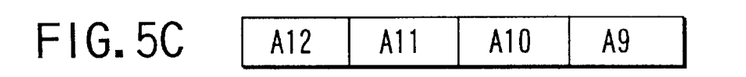
Figure 5D:
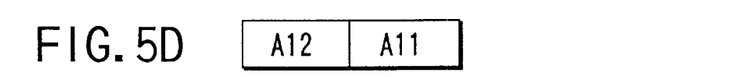
Figure 5E:
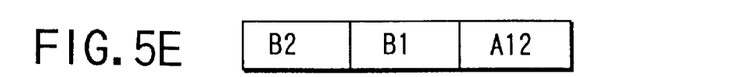
Figure 5F:
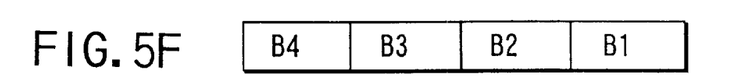
Figure 6:
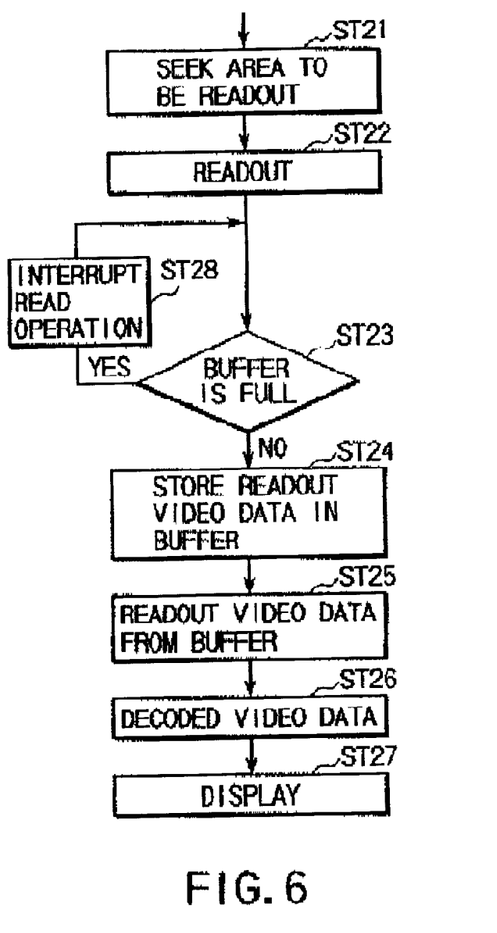
FIG. 6 is a flowchart showing the reproducing operation of the video disk apparatus shown in FIG. 1.

The operation of continuously reproducing a plurality of digital video data, recorded in recording areas of different radius positions on the optical disk 17 without interruption, is described referring to FIGS. 4 through 6.

FIG. 4 is a graph showing the quantity of digital video data in the buffer memory 14 at the time of reproducing a plurality of digital video data. Further, the contents of the buffer memory 14 at times ta, tb, tc, td, te, tf (in FIG. 4) are described per 1 M bit in FIGS. 5A, 5B, 5C, 5D, 5E, 5F, respectively. FIGS. 5A through 5F are charts showing the content change of the video data in the buffer memory 14. In FIGS. 5A through 5F, one rectangle shows digital video data for 1 M bits. FIG. 6 is a flowchart showing the reproducing operation of the video disk apparatus.

The case of reproducing the data of the digital video A for 3 seconds and then reproducing the data of the digital video B is described as an example. When the optical head 16 is moved to the recording area 31 by the seeking operation (ST21), the data of the digital video A is read out at the speed of 8 Mbps from the recording area 31 (ST22). In this time, it is determined whether the buffer memory 14 is full (ST23). If the determination is "YES", the read operation is interrupted during a predetermined time interval (ST28) and tile process returns to step ST23. If the determination is NO, the readout data is stored in the buffer memory 14 (ST24), and, at the same time, is read out from the buffer memory 14 at the speed of 4 Mbps and output to the MPEG decoder 18 (ST25). Since a speed difference exists between the reading speed from the optical disk 17 and the bit rate of the digital video data, the digital video data of (8 Mbps–4 Mbps)*1 second=4 M bits is stored in the buffer memory 14 at the time ta after 1 second. This is shown in FIG. 4 and FIG. 5A.

As shown in FIG. 5A, the memory capacity of the buffer memory 14 is filled to 4 M bits, reproduction of the digital video data from the optical disk 17 is stopped until the next time tb for 0.5 second and returned to the seeking (ST21). However, since the digital video data stored in the buffer memory 14 is read out at the speed of 4 Mbps and outputted to, the MPEG decoder 18 (ST26) during the time ta–tb, the video A displayed on the monitor 19 is reproduced continuously (ST27). Since new digital video data is not input to the buffer memory 14 during the period, the digital video data in the buffer memory 14 become 4 M bits–4 Mbps*0.5 second=2 M bits. This is shown in FIG. 4 and FIG. 5B.

For the next 0.5 second in time tb–tc, the data of the video A is read out from the optical disk 17 at the speed of 8 Mbps and stored in the buffer memory 14. The digital video data stored in the buffer memory 14 for the 0.5 second become 2 M bits+(8 Mbps–4 Mbps) *0.5 second=4 M bits. This is shown in FIG. 4 and FIG. 5C.

The digital video data reproduced from the optical disk 17 during the time 0 to the time tc is 8 Mbps*(1 second+0.5 second )=12 M bits. Since this is the capacity corresponding to the digital video for 3 seconds, reproduction of the video A data from the optical disk 17 is stopped. Since it takes 0.5 second to reduce the 4 M bits of the digital video A data stored in the buffer memory 14 to 2 M bits, the optical head 16 can access to the starting position of the digital video B data recorded in the recording area 33 during the period. Since the maximum access time is 0.25 second, the operation of the optical disk 17 is stopped for the initial 0.25 second.

In 0.25 second in the next time tc–td, the optical head 46 moves from the recording area 31 to the starting position of the digital video B data in the recording area 33. Since the digital video A data stored in the buffer memory 14 is read out at the speed of 4 Mbps and outputted to the MPEG decoder 18 during the period, the video A data displayed on the monitor 19 can be reproduced without interruption. Since new digital video data is not input to the buffer memory 14 during the period, the digital video data in the buffer memory 14 becomes 4 M bits–4 Mbps:*0.5 second=2 M bits. This is shown in FIG. 4 and FIG. 5D.

In 0.25 second, from the time td–te, the video B data is read out from the optical disk 17. The digital video data stored in the buffer memory 14 in the 0.25 seconds is 2 M bits+(8 Mbps–4 Mbps)*0.25 second=3 M bits. This is shown in FIG. 4 and FIG. 5E. At the time of te, since the digital video A data for 4 Mbps*0.25 second=1 bits is read out from the buffer memory 14 and output to the MPEG decoder 18, the digital video B data for 8 Mbps*0.25=2 M bits is reproduced from the optical disk 17 and stored in the buffer memory 14. The content of the buffer memory 14 becomes, as shown in FIG. 5E, 1 M bits of the digital video A data and 2 M bits of the digital video B data.

For 0.25 seconds in the time te–tf, the video B data is read out from the optical disk 17. The digital video data stored in the buffer memory 14 in the 0.25 second is 3 M bits+(8 Mbps–4 Mbps)*0.25 second=4 M bits. This is shown in FIG. 4 and FIG. 5F. The content of the buffer memory 14 is entirely the digital video B data. Thereafter the digital video B data is read out from the buffer memory 14 and output to the MPEG decoder 18 so that the digital video B is indicated on the monitor 19.

During the access of the optical head 16, the digital video A data preliminary stored in the buffer memory 14 is read out and output to the MPEG decoder 18. Since the digital video B data is already stored in the buffer memory 14 at the time all the data of the digital video A in the buffer memory 14 is read out, they can be output continuously to the MPEG decoder 18.

Accordingly, the data of the digital video A and the data of the digital video B recorded in the different recording areas with respect to the radius positions of the optical disk 17 can be continuously input to the MPEG decoder 18 via the buffer memory 14 to be decoded so that the videos can be displayed on the monitor 19 without interruption between the digital videos A and B.

Also in the case of continuous reproduction of the digital videos A, B, C, or continuous reproduction of the digital videos in a different order C, B, A, it is apparent that continuous reproduction can be achieved similarly, by storing in advance an amount of digital video data corresponding to the access time in the buffer memory 14 so that the digital video data in the buffer memory 14 can be read out during access.

The movement of the optical head 16 from a recording area to another recording area on the optical disk 17, that is, seeking may be unsuccessful for various reasons, such as the inability to read address information recorded in the optical disk 17. In that case, the seeking operation is conducted again with the upper limit of a preliminary set retrial number in the video disk apparatus of this embodiment. During the retrial of the seeking operation, the digital video data is read out from the buffer memory 14.

Herein, if the capacity of the buffer memory 14 is set at A*S*(N+1) bits or more, where the bit rate of the digital video data is A (bps), the maximum access time (tile seeking time for moving the optical head 16 from the innermost periphery to the outermost periphery of the optical disk 17 plus the time for rotating the optical disk 17 by one rotation) is S seconds, and the number of seeking retrials at the time of unsuccessful seeking is N, the digital video data can be read out from the buffer memory 14 even during accessing by storing in advance the amount of digital video data for the access time of the optical head 16 including the seeking retrial time in the buffer memory 14. As a result, video reproduction can be achieved without interuption of the video. Here, the A*S bits among tile A*S*(N+1) bits are for the initial access, and the A*S*N bits are for the retrials.

Although the amount of digital video data corresponding to the maximum access time to the optical disk 17 was referred to as the buffer memory 14 capacity in the explanation above, in the case of adopting a video disk apparatus comprising an automatic disk changer for automatically changing the optical disk 17, the buffer memory 14 capacity can be set at A*S2 bits or more, supposing that the sum of the maximum exchange time of the optical disk 17 (the maximum time for replacing the currently set optical disk by tile farthest optical disk for recording and reproduction) and the maximum access time to the optical disk 17 is S2, and the bit rate of the digital video data is A (bps).

In this configuration, the amount of digital video data corresponding to the disk replacement time and the access time can be stored preliminary in the buffer memory 14. Consequently, the digital video data can be read out from the buffer memory 14 during the replacement time of the optical disk 17 and the access time of the optical head 16. Even in the case of reproducing digital video data recorded among a plurality of optical disks, the videos can be reproduced without interruption.

In consideration of the retrials at the time of unsuccessful disk replacement and at the time of unsuccessful seeking, the memory capacity of the buffer memory 14 can be A*S1*(N1+1)+A*S2*(N2+1) bits or more, supposing that the maximum time for the disk replacement is S1 second, the number of retrials at the time of unsuccessful disk replacement is N1, the maximum access time to the optical head 16 (the seeking time for moving the optical head 16 from the innermost periphery to the outermost periphery of the optical disk 17 plus the time for rotating the optical disk 17 by one rotation) is S2 seconds, and the number of retrials at the time of unsuccessful seeking is N2. According to the configuration, since digital video data can be read out from the buffer memory 14 even when retrials are conducted for the optical disk replacement and the optical head access, digital video data in a plurality of disks can be reproduced without interruption.

By using the above-mentioned function for continuously reproducing a plurality of videos, editing videos is improved because the end result can be viewed before changing the video. Specifically, the anticipated edited reproduced video can be reproduced continuously before editing by commanding the optical head 16 to reproduce selected portions of video. At the time of editing, videos recorded in a plurality of areas in different positions with respect to the radial direction in the optical disk 17 are recorded in the same area in the, optical disk as one video data. Therefore, since the result of the editing can be confirmed beforehand, the editing efficiency can be improved.

In the above embodiment, the present invention is applied to a recording/reproducing apparatus. However, the present invention can be applied to a video player.

Figure 7:
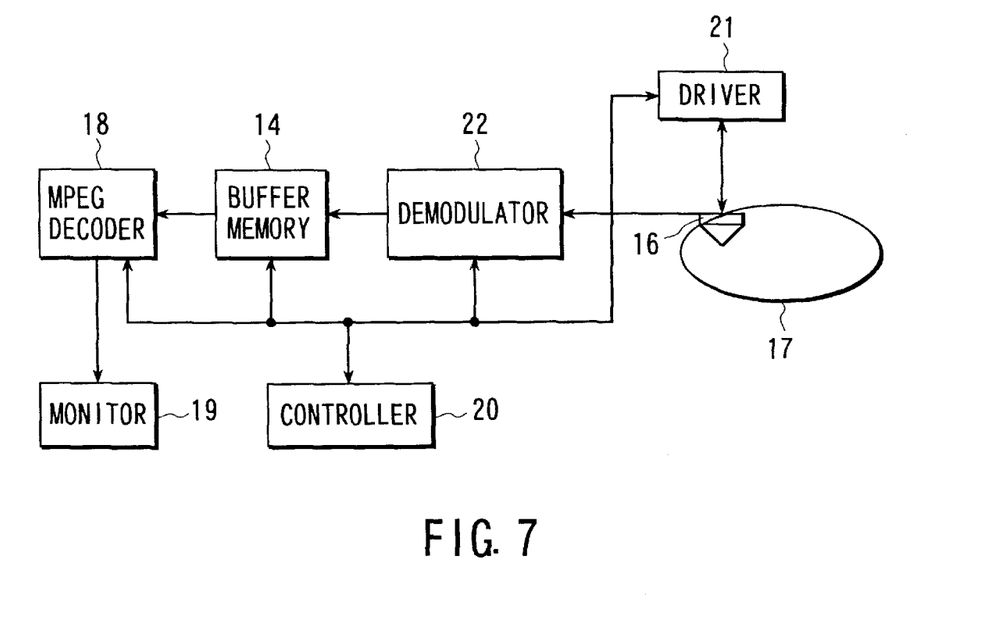
FIG. 7 is a block diagram of a video disk player according to another embodiment of the present invention.

FIG. 7 is a block diagram illustrating a video disk player according to another embodiment of the present invention. In this case, the video player comprises a buffer memory 14, an optical head 16, a MPEG encoder 18, a monitor 19, a controller 20, a driver 21, and a demodulator 22. The operation of the video player is similar to the reproducing mode of the video disk apparatus of FIG. 1.

Also, the present invention may be applied to an audio apparatus.

Figure 8:
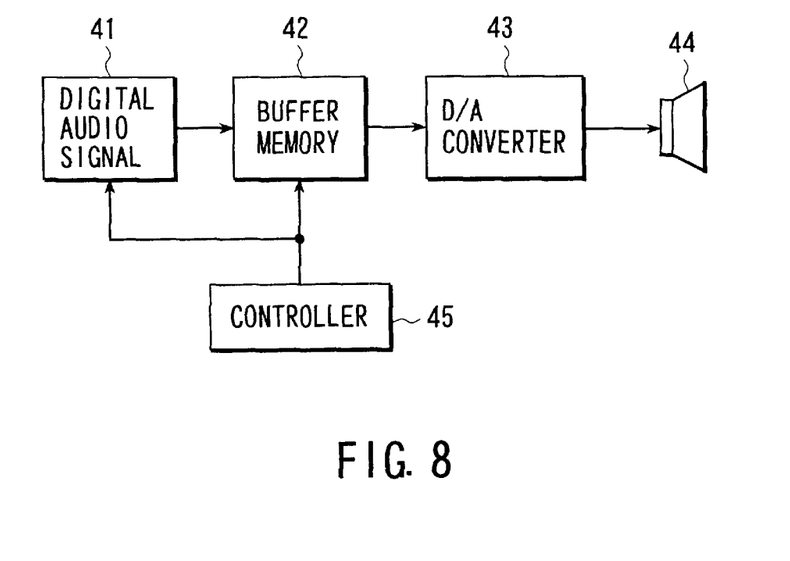
FIG. 8 is a block diagram of an audio disk apparatus according to yet another embodiment of the present invention.

FIG. 8 is a block diagram of an audio disk apparatus according to yet another embodiment of the present invention. The audio disk apparatus comprises a digital audio signal circuit 41, a buffer memory 42, a digital-to-analog (D/A) converter 43, a speaker 44, and a controller 45. In this audio apparatus, the digital audio signal from the digital audio signal circuit 41 is stored in the buffer memory 42 and at, the same time, the audio signal stored in the buffer memory 42 is read out to the speaker 44 via the D/A converter 43.

The digital audio signal circuit 41 and the buffer memory 42 are controlled lay the controller 45 for controlling the write-in and readout timings of the buffer memory 42.

According to the above audio apparatus, even if the audio signal from the digital audio circuit 41 is interrupted during a seek operation, since the audio signal read out from the buffer memory 42 is supplied to tile speaker 44 via the D/A converter 43, the speaker 44 can continuously output an audio sound. In other words, the present invention can be applied to apparatuses for recording and/or reproducing data continuously in time, e.g., continuous data such as video data and audio data.

Although embodiments with an optical disk as the recording medium have been, described, other apparatus using a disk type recording medium for recording and reproducing data with a recording and reproducing head can be used. Examples thereof include a magnetic disk apparatus (hard disk apparatus) and a floppy disk apparatus.

As heretofore explained, according to the present invention, an amount of digital video data corresponding to the access time of the recording and reproducing head or more are preliminary reproduced from the recording medium and stored in the buffer memory utilizing the difference between the reproducing speed of the recording medium and the bit rate of the digital video data. The digital video data stored in the buffer memory is read out during the access for seeking digital video data recorded in areas of different positions with respect to the radius direction of the disk in a preliminary determined order, so that the digital video can be reproduced during the access. As a result, the digital videos recorded in different areas of optional positions with respect to the radius direction in the disk can be reproduced without interruption using one recording and reproducing head.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk apparatus using a recording disk and connected to an input/output device, comprising;

a recording and reproducing head which records and reproduces digital data on and from the recording disk, the digital data being recorded on a plurality of recording areas of the recording disk at different positions with respect to a radial direction of the recording disk;

a dual port buffer memory that includes at least a first input to receive the digital data at a first bit rate, a second input to receive the digital data at a second bit rate, and a first output to provide digital data stored therein at a third hit rate, and a second output to provide digital data stored therein at a forth rate, said buffer memory configured to temporarily store the digital data reproduced by the recording and reproducing head to compensate for differences at least between the first and third bit rates, wherein the buffer memory has a memory capacity based on a bit rate of the digital data, a maximum access time required for moving the recording and reproducing head from an innermost periphery of the recording disk to an outermost periphery plus a time required for rotating the recording disk by one rotation, and at least one seeking retrial; and a controller coupled to said recording and reproducing head and said buffer memory, wherein said controller operates to control said recording and reproducing head and said buffer memory to:

selectively reproduce digital data for a time more than an access time to access said plurality of recording areas of the recording disk at the second bit rate and store the digital data in said buffer memory, selectively record digital data from said buffer memory to said plurality of recording areas at the third bit rate, continuously reproduce digital data recorded in a plurality of areas in different position with respect to the radial direction, including reproducing uninterrupted digital data anticipated to be edited before the digital data reproduced by the recording and reproducing head is edited, and continuously record said continuously reproduced digital data in the same area of the disk.

2. The disk apparatus according to claim 1, wherein the controller stores digital data reproduced from the recording disk in the buffer memory, the digital data having an amount of data corresponding to at least an access time required for accessing the plurality of areas at a rate higher that a bit rate at which the data is input to or output from the input/output device.

3. The disk apparatus according to claim 1, wherein the controller controls the buffer memory to continuously output the digital data stored therein to the input/output device when the recording and reproducing head is positioned near the plurality of areas and during the accessing.

4. The disk apparatus according to claim 1, wherein the recording and reproducing head selectively records and reproduces digital data on and from a plurality of recording disks.

5. The disk apparatus according to claim 1, wherein the buffer memory has a memory capacity of A*S bits, where a bit rate of the digital data is A, and a maximum access time to the recording disk which is a seeking time required for moving the recording and reproducing head from an innermost periphery of the recording disk to an outermost periphery plus time for rotating the recording disk by one rotation is S.

6. The disk apparatus according to claim 1, wherein the buffer memory has a memory capacity of A*S*(N+1) bits, where a bit rate of the digital data is A, a maximum access time to the recording disk which is a seeking time for moving the recording and reproducing head from an innermost periphery of the recording disk to an outermost periphery plus time for rotating the recording disk by one rotation is S, and a number of the seeking retrials is N where N is greater than O.

7. The disk apparatus according to claim 1, wherein the buffer memory has a memory capacity of A*S bits, where the sum of the maximum time for replacing the recording disk and a maximum access time to the recording disk which is a seeking time required for moving the recording and reproducing head from an innermost periphery of the recording disk to an outermost periphery plus a time required for rotating the recording disk by one rotation is S, and a bit rate of the digital data is A.

8. The disk apparatus according to claim 1, wherein the buffer memory has a memory capacity of A*Si*(N1+1)+ A*S2*(N2+1) bits, where a maximum time for replacing the recording disk is Si, the number of the retrials at the time of an unsuccessful replacement of the recording disk is Ni where Ni is greater than O, a maximum access time to the recording disk which is a seeking time required for moving the recording and reproducing head from an innermost periphery of the recording disk to an outermost periphery plus a time required for rotating the recording disk by one rotation is S2, a number of the retrials at the time of an unsuccessful seeking is N2 where N2 is greater than O, and a bit rate of the digital data is A.

* * * * *